(12) United States Patent
Vawter et al.

(10) Patent No.: US 7,564,387 B1
(45) Date of Patent: Jul. 21, 2009

(54) OPTICAL ANALOG-TO-DIGITAL CONVERTER

(75) Inventors: G. Allen Vawter, Corrales, NM (US); James Raring, Goleta, CA (US); Erik J. Skogen, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 12 days.

(21) Appl. No.: 12/039,931

(22) Filed: Feb. 29, 2008

(51) Int. Cl.
*H03M 1/00* (2006.01)
(52) U.S. Cl. .................................. 341/137; 341/155
(58) Field of Classification Search ................. 341/137, 341/155
See application file for complete search history.

(56) References Cited

U.S. PATENT DOCUMENTS

| | | | |
|---|---|---|---|
| 4,058,722 | A | 11/1977 | Taylor |
| H353 | H | 10/1987 | Taylor |
| 4,928,007 | A | 5/1990 | Furstenau et al. |
| 5,381,147 | A * | 1/1995 | Birkmayer ............... 341/137 |
| 6,118,396 | A * | 9/2000 | Song ........................ 341/137 |
| 6,175,320 | B1 * | 1/2001 | Heflinger ................. 341/137 |
| 6,292,119 | B1 | 9/2001 | Carillo, Jr. et al. |
| 6,326,910 | B1 | 12/2001 | Hayduk et al. |
| 6,571,028 | B1 | 5/2003 | LoCascio et al. |
| 6,661,361 | B1 * | 12/2003 | Lewis et al. ............. 341/137 |

OTHER PUBLICATIONS

Lucas B. Soldano et al, "Optical Multi-Mode Interference Devices Based on Self-Imaging: Principles and Applications", Journal of Lightwave Technology, vol. 13, No. 4, 1995, pp. 615-627.
L.H. Spiekman et al, "All-Optical Mach-Zehnder Wavelength Converter with Monolithically Integrated DFB Probe Source", IEEE Photonics Technology Letters, vol. 9, No. 10, 1997, pp. 1349-1351.
O. Audouin et al, "Use of Fast In-Line Saturable Absorbers in Wavelength-Division-Multiplexed Soliton Systems," IEEE Photonics Technology Letters, vol. 10, No. 6 1998, pp. 828-829.
Kristian E. Stubjaer, "Semiconductor Optical Amplifier-Based All-Optical Gates for High-Speed optical Processing", IEEE Journal on Selected Topics in Quantum Electronics, vol. 6, No. 6, 2000, pp. 1428-1435.
E. P. Burr et al, "28 ps recovery time in an InGaAsP/InGaAsP multiple-quantum-well saturable absorber employing carrier sweepout", Journal of Applied Physics, vol. 90, No. 7, 2001, pp. 3566-3569.

(Continued)

*Primary Examiner*—Khai M Nguyen
(74) *Attorney, Agent, or Firm*—John P. Hohimer

(57) ABSTRACT

An optical analog-to-digital converter (ADC) is disclosed which converts an input optical analog signal to an output optical digital signal at a sampling rate defined by a sampling optical signal. Each bit of the digital representation is separately determined using an optical waveguide interferometer and an optical thresholding element. The interferometer uses the optical analog signal and the sampling optical signal to generate a sinusoidally-varying output signal using cross-phase-modulation (XPM) or a photocurrent generated from the optical analog signal. The sinusoidally-varying output signal is then digitized by the thresholding element, which includes a saturable absorber or at least one semiconductor optical amplifier, to form the optical digital signal which can be output either in parallel or serially.

30 Claims, 8 Drawing Sheets

OTHER PUBLICATIONS

J. De Merlier et al, "All-optical 2R regeneration based on integrated asymmetric Mach-Zehnder interferometer incorporating MMI-SOA", Electronics Letters, vol. 38, No. 5, 2002, pp. 238-239.

Y.-O. Kim et al, "2R limiter circuit with gain clamped SOA for XGM wavelength converter", IEEE Proc. Optoelectron, 2005, vol. 152, No. 1, pp. 11-15.

Erik J. Skogen, et al, "Monolithically Integrated Active Components: A Quantum-Well Intermixing Approach", IEEE Journal of Selected Topics in Quantum Electronics, vol. 11, No. 2, 2005, pp. 343-355.

James W. Raring et al, "40-Gb/s Widely Tunable Transceivers", IEEE Journal of Selected Topics in Quantum Electronics, vol. 13, No. 1, 2007, pp. 3-14.

George C. Valley, "Photonic analog-to-digital converters", Optics Express, vol. 15, No. 5, 1955, 28 pages.

* cited by examiner

OPTICAL ANALOG-TO-DIGITAL CONVERTER

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to optical analog-to-digital converters (ADCs), and in particular to an optical ADC which can be formed as a photonic integrated circuit (PIC) and which can convert an optical analog input signal into an optical digital output signal.

BACKGROUND OF THE INVENTION

Analog-to-digital converters (ADCs) have traditionally been fabricated using electronic integrated circuits. The function of an ADC is to repeatedly sample a time-varying analog waveform, generally at fixed time intervals, and to generate a digital representation of the analog waveform with a certain level of precision. The precision of electronic ADCs, however, is currently limited to an effective number of bits (ENOB) of 8.5 at 2 GHz RF bandwidth, and decreases with increasing frequency.

Optical ADCs promise to overcome the limitations of electronic ADCs and to provide an improved speed and resolution for the digitization of analog waveforms at very high frequencies greater than about 10 GHz. There are many different and varied types of optical ADCs known to the art which have been summarized in a recent review article by G. C. Valley entitled "Photonic Analog-to-Digital Converters" published in Optics Express, vol. 15, paper no. 75372, 5 Mar. 2007. Various types of optical ADCs are also disclosed in the following U.S. Pat. Nos. 4,058,722; 4,928,007; 6,292,119; and 6,326,910; and in U.S. Statutory Invention Registration No. H353.

The present invention provides an advance in the art of optical ADCs by providing an optical ADC which can be made to be all-optical in that it can receive an optical analog input signal and convert this signal into an optical digital output signal.

The optical ADC of the present invention can be formed as a photonic integrated circuit (PIC) which provides each bit of the optical digital signal spatially separated so that each bit of the optical digital signal can be directed into a different optical fiber for parallel data transmission. Alternately, an optical waveguide combiner can be provided in the optical ADC or as a separate PIC for use with the optical ADC to generate a serial optical output by interleaving the various bits of the optical digital signal.

These and other advantages of the present invention will become evident to those skilled in the art.

SUMMARY OF THE INVENTION

The present invention relates to an optical analog-to-digital converter (ADC) which converts an optical analog signal to an optical digital signal which is a digital representation of the optical analog signal. The optical ADC comprises a plurality of channels, with each channel receiving the optical analog signal and a sampling optical signal and generating therefrom a bit of the optical digital signal. The plurality of channels includes a first channel providing a most significant bit (MSB), a last channel providing a least significant bit (LSB), and a plurality of intermediate channels providing bits of lessening significance between the MSB and the LSB. The plurality of channels receiving the optical analog signal and the sampling optical signal can comprise, for example, four channels to provide an 8-bit digital representation of the optical analog signal.

Each channel can be formed on a common semiconductor substrate and includes an optical waveguide interferometer and an optical thresholding element. The optical waveguide interferometer has a pair of waveguide arms into which the sampling optical signal is split and directed, and can be formed as a Mach-Zehnder interferometer. The optical analog signal is directed into only one waveguide arm (also referred to herein as a phase delay arm) to produce a phase delay of the sampling optical signal in that waveguide arm. The phase delay is proportional to the intensity of the optical analog signal and also to the length of the phase delay arm. The optical waveguide interferometer then generates an optical output signal by combining the sampling optical signal from the pair of waveguide arms (i.e. the sampling optical signal with the phase delay from the phase delay arm, and the sampling optical signal from the other waveguide arm without the phase delay). This produces a sinusoidal modulation of the optical output signal which depends upon the intensity of the optical analog signal. The optical thresholding element then receives the optical output signal from the optical waveguide interferometer and generates one of the bits of the optical digital signal from the optical output signal.

The optical ADC can be formed on a semiconductor substrate which comprises a III-V compound semiconductor such as gallium arsenide (GaAs) or indium phosphide (InP).

The optical ADC can also include a plurality of optical waveguides formed on the semiconductor substrate to conduct the optical analog signal and the sampling optical signal from input ports located on one edge of the semiconductor substrate to the plurality of channels, and to conduct each bit of the optical digital signal from one of the optical thresholding elements to a different output port located on another edge of the semiconductor substrate. The plurality of optical waveguides can form an optical waveguide splitter to split the optical analog signal into a plurality of portions prior to being received into the various channels of the optical ADC. The plurality of optical waveguides can also form another waveguide splitter to split the sampling optical signal into a plurality of portions which can be received into the plurality of channels of the optical ADC. Certain of the optical waveguides can also include semiconductor optical amplifiers (SOAs), as needed, to amplify the optical analog signal, or the sampling optical signal, or both.

The optical analog signal can be provided by a semiconductor laser; and the sampling optical signal can be provided by another semiconductor laser. The semiconductor lasers will generally be located off the semiconductor substrate, although in certain embodiments of the present invention, at least one of the semiconductor lasers can be located on the semiconductor substrate with the Optical ADC.

The optical waveguide interferometer in each of the plurality of channels of the optical ADC can have a different length in certain embodiments of the present invention. In these embodiments, the lengths of the optical waveguide interferometer, which is generally the length of each waveguide arm therein, can be given by $L, 2L, 4L, \ldots 2^{(N-1)}L$ where N is a number of bits of the optical digital signal, and L is the length of the optical waveguide interferometer in the channel providing the MSB of the optical digital signal, and $2^{(N-1)}L$ is the length of the optical waveguide interferometer in the channel providing the LSB of the optical digital signal. The ordering of the various optical waveguide interferometers on the semiconductor substrate can be from the MSB to the LSB, although those skilled in the art will understand that any other ordering arrangement can be used since each bit of the optical digital signal can be separately output to a different optical fiber to provide a parallel optical output, or alternately directed into an optical waveguide combiner which rearrange the various bits of the optical digital signal, as needed, to generate a serial optical output.

The optical thresholding element can comprise an asymmetric active Mach-Zehnder interferometer which includes an SOA which provides a different optically-induced phase shift in each arm thereof to provide a step-like optical transfer characteristic. This step-like optical transfer characteristic conditions the optical output signal which is input into the optical thresholding element and thereby produces the optical digital signal at an output side of the optical thresholding element. Alternately, the optical thresholding element can comprise a saturable absorber (SA).

The present invention also relates to an ADC for converting an optical analog signal to an optical digital signal which comprises a plurality of channels each receiving the optical analog signal and a sampling optical signal and providing a bit of the optical digital signal, with the plurality of channels including a first channel providing a most significant bit (MSB), a last channel providing a least significant bit (LSB), and a plurality of intermediate channels providing bits of lessening significance between the MSB and the LSB. Each channel can be formed on a common semiconductor substrate and includes a waveguide photodetector to convert the optical analog signal into an photocurrent signal; an optical waveguide interferometer to generate an optical output signal from inputs of the photocurrent signal and the sampling optical signal, and an optical thresholding element to generate one of the bits of the optical digital signal from the optical output signal from the optical waveguide interferometer. The optical ADC can be formed as a photonic integrated circuit (PIC) on the semiconductor substrate which can comprise a III-V compound semiconductor material such as indium phosphide (InP) or gallium arsenide (GaAs).

The optical waveguide interferometer, which can be a Mach-Zehnder interferometer, has a pair of waveguide arms, with the sampling optical signal being split and directed into each waveguide arm, and with the photocurrent signal being provided to an electrode located proximate to only one of the pair of waveguide arms (i.e. on the phase delay arm). The photocurrent signal, which flows through the phase delay arm to a resistor connected to ground electrical potential, produces a phase delay in the sampling optical signal in the phase delay arm. The optical waveguide interferometer then recombines the sampling optical signals from each waveguide arm to generate an optical output signal which contains information that can be used to construct a particular bit of the optical digital signal by feeding the optical output signal into the optical thresholding element.

A plurality of optical waveguides can be formed on the semiconductor substrate to conduct the optical analog signal and the sampling optical signal from input ports located on one edge of the semiconductor substrate to the plurality of channels, and to conduct each bit of the optical digital signal from one of the optical thresholding elements to a different output port located on another edge of the semiconductor substrate. The waveguides connected to the input ports can include a pair of optical waveguide splitters, with one of the optical waveguide splitters being used to split the optical analog signal into a plurality of portions prior to being received into the plurality of channels, and with the other optical waveguide splitter being similarly used to split the sampling optical signal into a plurality of portions before this signal is received into the plurality of channels. The plurality of channels receiving the optical analog signal and the sampling optical signal can comprise, for example, four channels to provide four bits of resolution for the optical digital signal produced by the optical ADC.

The optical analog signal can be provided by a semiconductor laser; and the sampling optical signal can be provided by another semiconductor laser. Each semiconductor laser can comprise, for example, a distributed feedback (DFB) laser, or a vertical-cavity surface-emitting laser (VCSEL). Each semiconductor laser can be located adjacent to the optical ADC, located remotely from the optical ADC (e.g. using optical fibers to couple the optical signals from the lasers to the optical ADC), or in some cases located on the same semiconductor substrate as the optical ADC.

The optical waveguide interferometer for each channel of the optical ADC can have substantially the same length when each photodetector produces a different photocurrent signal (e.g. in a ratio 1:2:4: . . . :2N where N is a number of bits of the optical digital signal). Alternately, the optical waveguide interferometer for each channel of the optical ADC can have a different length given by L, 2L, 4L, . . . $2^{(N-1)}L$ where N is the number of bits of the optical digital signal, and L is the length of the optical waveguide interferometer in the channel providing the MSB of the optical digital signal, and $2^{(N-1)}L$ is the length of the optical waveguide interferometer in the channel providing the LSB of the optical digital signal.

The optical thresholding element, which is used to convert the optical output signal for each channel of the optical ADC into one of the bits of the optical digital signal, can comprise an asymmetric active Mach-Zehnder interferometer having an SOA located in each waveguide arm thereof. The asymmetric active Mach-Zehnder interferometer provides a different optically-induced phase shift in each waveguide arm thereof to provide a step-like optical transfer characteristic which conditions the optical output signal and thereby produces the optical digital signal. Alternately, the optical thresholding element can comprise a saturable absorber.

The present invention further relates to an optical ADC which is formed on a semiconductor substrate as a photonic integrated circuit (PIC). The optical ADC has a pair of optical input ports on the semiconductor substrate to receive an optical analog signal and a sampling optical signal, with the sampling optical signal defining a sampling rate at which the optical analog signal is to be converted into an optical digital signal. A pair of optical waveguide splitters is provided on the semiconductor substrate, with one of the optical waveguide splitters receiving the optical analog signal and splitting this signal into a number N portions where N is equal to a number of bits of the optical digital signal, and with the other optical waveguide splitter receiving the sampling optical signal and splitting the sampling optical signal into N portions. A plurality of waveguide photodetectors are also provided on the semiconductor substrate to receive the N portions of the optical analog signal to generate therefrom N photocurrent signals. The semiconductor substrate also includes a plurality of optical waveguide interferometers, with each optical waveguide interferometer having a pair of waveguide arms which are interconnected at each end of that optical waveguide interferometer. Each optical waveguide interferometer receives one of the N portions of the sampling optical signal and one of the N photocurrent signals and uses these signals to generate an optical output signal which contains information to form one bit of the optical digital signal. A plurality of optical thresholding elements are located on the semiconductor substrate, with each optical thresholding element receiving the optical output signal from one of the plurality of optical waveguide interferometers and generating therefrom one of the bits of the optical digital signal.

A plurality of optical output ports can also be provided on the semiconductor substrate, with each optical output port providing an optical output of one of the bits of the optical digital signal. In some cases, an optical waveguide combiner can be used to receive each bit of the optical digital signal and to generate therefrom a serial optical output.

The optical ADC can also optionally include a plurality of semiconductor optical amplifiers located between the optical waveguide splitter for the optical analog signal and the plurality of waveguide photodetectors. The semiconductor optical amplifiers are useful to amplify the N portions of the optical analog signal prior to generating the N photocurrent signals.

The semiconductor substrate can comprise a III-V compound semiconductor substrate (e.g. a GaAs or InP substrate). The sampling optical signal can be in a wavelength range of 0.8-2.0 microns; and the optical analog signal can also be in this same wavelength range.

The different lengths of each optical waveguide interferometer in some embodiments of the optical ADC of the present invention can be given by $L, 2L, 4L, \ldots 2^{(N-1)}L$ where N is the number of bits of the optical digital signal, and L is the length of the optical waveguide interferometer which provides a most significant bit (MSB) of the optical digital signal, and $2^{(N-1)}L$ is the length of the optical waveguide interferometer which provides a least significant bit (LSB) of the optical digital signal. In other embodiments of the optical ADC of the present invention, the length of each optical waveguide interferometer can be substantially the same when each photodetector produces a different photocurrent signal (e.g. in a ratio 1:2:4: . . . :2N where N is the number of bits of the optical digital signal).

Each optical thresholding element can comprise an asymmetric active Mach-Zehnder interferometer having a semiconductor optical amplifier which provides a different optically-induced phase shift in each waveguide arm thereof to provide a step-like optical transfer characteristic and thereby condition the optical output signal to produce the optical digital signal.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
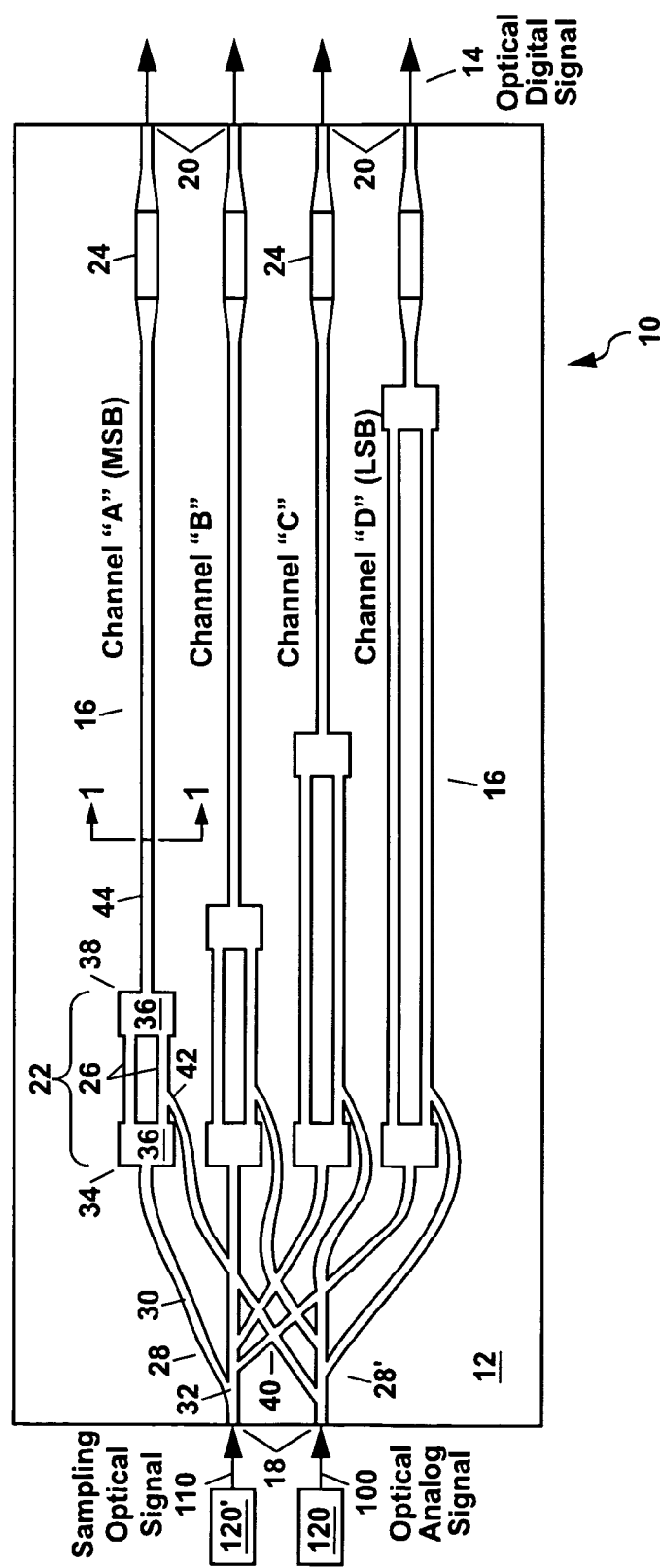
FIG. 1 shows a schematic plan view of a first example of the optical ADC of the present invention.
Figure 2A:
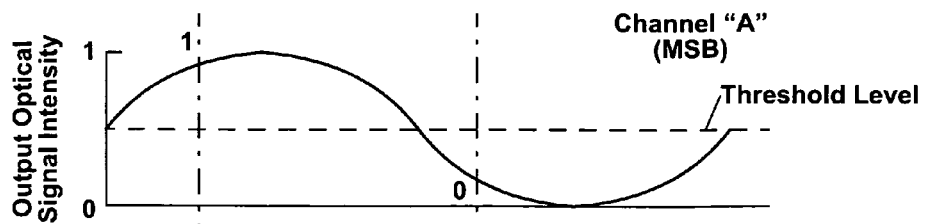
FIGS. 2A-2D show the sinusoidally varying intensity of the optical output signal in the output waveguides of the four channels of the optical ADC 10 in FIG. 1 prior to digitizing the optical output signal using the thresholding elements.
Figure 2B:
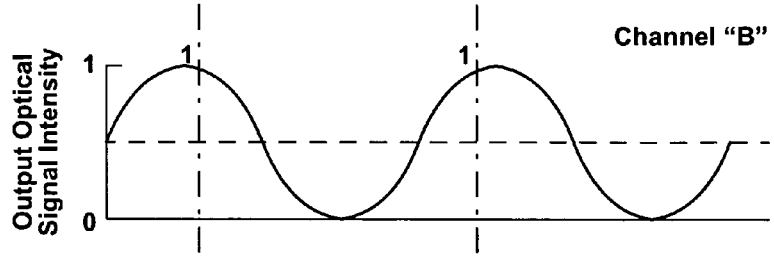
Figure 2C:
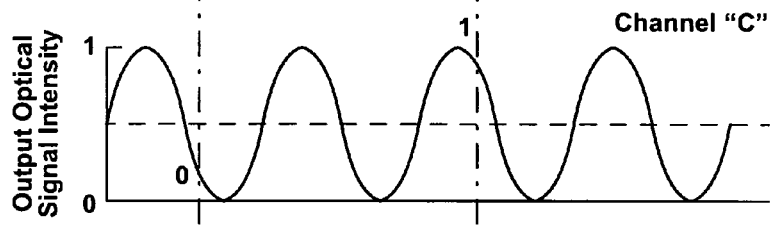
Figure 2D:
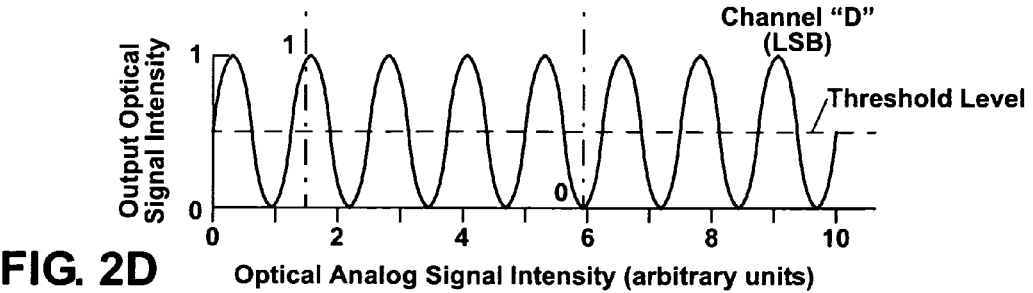

Referring to FIG. 1, there is shown a schematic plan view of a first example of the optical analog-to-digital converter (ADC) 10 of the present invention. The optical ADC 10, which can be formed as a photonic integrated circuit (PIC) on a common III-V compound semiconductor substrate 12 such as a gallium arsenide (GaAs) substrate or an indium phosphide (InP) substrate, is useful to generate an optical digital signal 14 output which is a digital representation of an optical analog signal 100 which is input to the optical ADC 10. The optical analog signal 100 can be provided, for example, by an optical fiber or a semiconductor laser 120 and can have a radio-frequency (rf) bandwidth from 100 MHz to 10 GHz or more.

The optical analog signal 100 is sampled and converted to the optical digital signal 14 at a sampling rate which is defined by a sampling optical signal 110 which acts as a clock for the analog-to-digital conversion. The sampling optical signal 110 can be provided from another optical fiber, or from another semiconductor laser 120' which can be modulated or pulsed (e.g. mode-lock pulsed) at a predetermined sampling rate which can be, for example, 1-50 Gigasamples per second (GSPS). The exact sampling rate will depend upon the frequency of the optical analog signal 100 which is being digitized by the optical ADC 10, and on a desired effective number of bits (ENOB) for the optical digital signal 14.

The optical ADC 10 comprises a plurality of channels 16 which are formed on the common semiconductor substrate 12 as shown in FIG. 1, with the various channels 16 being labelled as "A," "B," "C," and "D." In general, the optical ADC 10 can include N channels 16 where N is the number of bits being generated for the optical digital signal 14. Each channel 16 receives the optical analog signal 100 and a sampling optical signal 110 at a pair of optical input ports 18 located on one edge of the semiconductor substrate 12 and uses these signals 100 and 110 to generate a different bit of the optical digital signal 14. Each bit of the optical digital signal 14 can be provided to a separate output port 20 which can be located on another edge of the semiconductor substrate 12 as shown in FIG. 1. Each channel 16 of the optical ADC 10 comprises an optical waveguide interferometer 22, which can be either a Mach-Zehnder interferometer as shown in FIG. 1 or a Michelson interferometer, and also comprises an optical thresholding element 24.

The optical waveguide interferometer 22 in each channel 16 has a pair of waveguide arms 26 which receive the sampling optical signal 110 after this signal 110 is split into a number N of portions corresponding to the number of channels 16 in the optical ADC 10. In the example of FIG. 1, N=4 to provide nominally 4-bits of resolution, although in other embodiments of the present invention, N can range, for example, from 2 to 12 or more, depending upon the precision required for conversion of the optical analog signal 100 to a digital format and the exact rf bandwidth of the optical analog signal 100.

For the optical ADC 10 In FIG. 1, the sampling optical signal 110 is split into four portions using an optical splitter 28. The optical splitter 28 includes a plurality of single-mode waveguides 30 and can be formed using branching waveguide Y-junctions 32 as shown in FIG. 1. In other embodiments of the present invention, a 1×4 multimode interference splitter (also termed a MMI splitter) can be substituted for the optical splitter 28 in FIG. 1 (see FIG. 4).

A 1×2 MMI splitter 34 is used in the interferometer 22 in FIG. 1 to further split the sampling optical signal 110 into an additional two portions, with each portion of the sampling optical signal 110 being directed into one of the waveguide arms 26 of the interferometer 22. The MMI splitter 34 comprises a single-mode input waveguide, a laterally-multimoded waveguide section 36, and two single-mode output waveguides which form the arms 26 of the interferometer 22.

MMI splitters are well known in the art and need not be discussed in detail herein. See, for example, an article by L. B. Soldano et al., entitled "Optical Multi-Mode Interference Devices Based on Self-Imaging: Principles and Applications," in the *Journal of Lightwave Technology*, vol. 13, pp. 615-627, April 1995.

In FIG. 1, each interferometer 22 also includes a 2×1 MMI combiner 38 to recombine the sampling optical signal 110 from each waveguide arm 26 at an output end of that interferometer 22. The 2×1 MMI combiner 38 can be formed as a mirror image of the 1×2 MMI splitter 34, with the two arms 26 of the interferometer 22 providing inputs to a laterally-multimoded waveguide section 36, which, in turn, is connected to a single-mode waveguide 44 at an output of the 2×1 MMI combiner 38. In other embodiments of the present invention, branching waveguide Y-junctions 32 can be substituted for the 1×2 MMI splitter 34 and the 2×1 MMI combiner 38 to form each Mach-Zehnder interferometer 22 (see FIG. 4).

In FIG. 1, another optical splitter 28' is similarly used to split up the optical analog signal 100 into the same number N portions as the sampling optical signal 110. To route each portion of the optical analog signal 100, the single-mode waveguides 30 at the outputs of the two optical splitters 28 and 28' can cross over each other or can intersect directly with each other in a waveguide crossing 40 as shown in FIG. 1. Such waveguide crossings 40 can have a relatively low loss and low cross-talk which can be further reduced by slightly tapering each single-mode optical waveguide at the location of the waveguide crossing 40.

Each portion of the optical analog signal 100 can be optionally amplified after the optical splitter 28'. This can be done using a semiconductor optical amplifier which can be located between the optical splitter 28' and each optical waveguide interferometer 22 (see FIG. 3). Similarly, each portion of the sampling optical signal 110 can be optionally amplified after the optical splitter 28.

After being split, each portion of the optical analog signal 100 is fed into one waveguide arm 26 (i.e. the phase delay arm) of each interferometer 22 using a converging waveguide Y-junction 42. In the phase delay arm 26, which contains both the sampling optical signal 110 and the optical analog signal 100, the optical analog signal 100 produces a phase delay of the sampling optical signal 110; whereas no phase delay is generated in the other arm 26 of the interferometer 22 in which only the sampling optical signal 110 is present. This phase delay of the sampling optical signal 110 is due to a cross-phase-modulation (XPM) effect which arises from an optical nonlinearity in the phase delay arm 26 due to the presence of the optical analog signal 100.

The cross-phase-modulation effect, which occurs in a nonlinear Kerr-effect optical medium such as a III-V compound semiconductor material (e.g. InP, InGaAsP or GaAs), produces a change $\Delta n$ in the refractive index n of the nonlinear optical medium which is given by:

$$\Delta n(\lambda_2) = 2n_2 I(\lambda_1)$$

where $\lambda_2$ is the wavelength of the sampling optical signal 110, $n_2$ is a nonlinear coefficient of the III-V compound material forming a waveguide core of each waveguide arm 26, I is the intensity of the optical analog signal 100 in the phase delay arm 26, and $\lambda_1$ is the wavelength of the optical analog signal 100. The cross-phase-modulation effect allows the intensity of the optical analog signal 100 to generate a phase delay $\Delta\phi$ of the sampling optical signal 110 which accumulates with an increasing interaction length l where the signals 110 and 100 spatially overlap in the waveguide arm 26. At the end of the waveguide arm 26, the phase delay $\Delta\phi$ is:

$$\Delta\phi = \Delta n \cdot l$$

When the sampling optical signal 110 from the phase delay arm 26 is recombined in the 2×1 MMI combiner 38 with the sampling optical signal 110 from the other arm 26 in which no phase delay occurs due to the absence of the optical analog signal 100 in this arm 26, this produces a sinusoidal-intensity-modulated optical output signal in the output waveguide 44 from each interferometer 22. This optical output signal is modulated at the same frequency as the sampling optical signal 110 and has the same wavelength (i.e. $\lambda_2$).

The optical analog signal 100 is preferably not present in the output waveguide 44 and is also preferably not reflected back into the phase delay arm 26 by the 2×1 MMI combiner 38. If needed, an optical filter can be provided in the output waveguide 44 to remove or suppress the optical analog signal 100. This can be done, for example, by using a waveguide core which transmits at $\lambda_2$ and is absorptive at $\lambda_1$, or by providing a waveguide ring drop filter in the optical ADC 10 to remove the optical analog signal 100 from the waveguide 44 in each channel 16.

The lengths of the waveguide arms 26 in the different channels 16 of the optical ADC 10 in the example of FIG. 1 can be selected to be approximately equal to L, 2L, 4L and 8L to provide interaction lengths l which are in this same ratio (i.e. l, 2l, 4l and 8l) so that each interferometer 22 can be used to generate a different bit of the optical digital signal 14. In other embodiments of the present invention where more than four channels 16 are used in the optical ADC 10 to provide additional bits for the optical digital signal 14, the lengths of the interferometers 22 can be given by L, 2L, 4L, ... $2^{(N-1)}$L where N is the number of bits of the optical digital signal 14. In general, the lengths of the waveguide arms 26 for the various interferometers 22 will range from about 100 μm up to a few millimeters depending upon the number of channels 16 in the optical ADC 10. The width of the waveguide arms 26 and the various other waveguides in the optical ADC 10 can be, for example, 3-4 μm and will generally be selected to provide a fundamental mode propagation of the light (i.e. the optical signals 100 and 110) therein.

In the example of FIG. 1, a most significant bit (MSB) of the optical digital signal 14 is provided by channel "A" and a least significant bit (LSB) of the optical digital signal 14 is provided by channel "D." Each bit of the optical digital signal 14 in FIG. 1, which is indicated by a horizontal arrow exiting the substrate 12, is spatially separated so that it can be detected with a separate photodetector (not shown), or so that it can be directed into a separate optical fiber (not shown) to provide for parallel optical data transmission. When optical fibers are used for the parallel optical data transmission, they can be in the form of individual fibers or an optical fiber ribbon cable.

FIGS. 2A-2D schematically illustrate the sinusoidally varying intensity of the optical output signal in the output waveguides 44 of the four channels of the optical ADC 10 of FIG. 1 prior to being digitized by the thresholding elements 24. In FIGS. 2A-2D, the optical output signals for the four channels are labelled "A" "B" "C" and "D" and correspond to the same channels in FIG. 1. The horizontal dashed line in FIGS. 2A-2D indicates a threshold level of the optical thresholding element 24 above which the optical output signal is preferably converted to a logical "1" state by the optical thresholding element 24, and below which the optical output signal is preferably converted to a logical "0" state.

In FIGS. 2A-4D, the vertical dot-dash lines are provided to illustrate the optical digital signal 14 which will be generated by the optical ADC 10 for particular intensity levels of the input optical analog signal 100 corresponding to the locations of the vertical dot-dash lines. The digitized output which is generated by each channel of the optical ADC 10 is also indicated by the logical "1" and "0" states where the vertical dot-dash lines intersect with the sinusoidally varying curves for the optical output signals. Thus, for an optical analog signal intensity corresponding to the left-most vertical dot-dash line, the generated optical digital signal 14 after the thresholding element 24 will have a 4-bit binary representation "1101" and the generated optical digital signal 14 for the optical analog signal intensity corresponding to the right-most vertical dot-dash line will be "0110." The sampling rate at which the optical digital signal 14 is generated in the optical ADC 10 is determined by the sampling rate of the sampling optical signal 110 which can be, for example, up to about 50 GSPS.

Returning to FIG. 1, the optical thresholding element 24 used to convert the optical output signal from each interferometer 22 to being either high (i.e. a logical "1" state) or low (i.e. a logical "0" state) can comprise a saturable absorber (SA) or a semiconductor optical amplifier (SOA) formed from a III-V compound semiconductor such as InP, InGaAsP or GaAs. The SA and SOA both have an optical transmission characteristic which is nonlinear with the intensity of input light. Both the SA and SOA also have essentially the same structure which comprises a semiconductor optical waveguide containing a semiconductor p-n or p-i-n junction which will be described in more detail hereinafter.

Operation of the SA or SOA will, in general, depend upon the exact biasing conditions used. In a SA, a relatively low bias (e.g. near zero Volts) or a negative bias (i.e. a reverse bias) is used so that light signals below a saturation threshold of the SA will be absorbed to provide a relatively low output level corresponding to the logical "0" state, while light signals above the saturation threshold will be transmitted with little absorption to provide a relatively high output level corresponding to the logical "1" state.

In an SOA, forward biasing conditions are used. However, when the SOA is forward biased below a gain threshold level where optical amplification occurs, the SOA will behave much like a SA by absorbing low-level light signals while being saturated to transmit high-level light signals. When the SOA is operated above the threshold level for optical amplification, the SOA will amplify both low-level light signals and high-level light signals with the high-level light signals possibly saturating the optical gain of the SOA. This latter mode of operation is generally not used for the optical thresholding device 24 although it is useful elsewhere in the optical ADC 10 when amplification of light signals is needed.

The saturation threshold level of the SA or SOA can be set by the particular doping levels used for the p-n or p-i-n junction, and also by the bias conditions of the SA or SOA. The saturation threshold level of the SA or SOA can also be controlled by using the width, length or optical confinement factor of the thresholding element 24 as variables. When the thresholding element 24 has a width greater than that of the optical waveguides 44 as shown in FIG. 1, a tapered waveguide section can be provided on either side of the thresholding element 24 to laterally expand or contract the mode of the light for coupling into and out of the thresholding element.

In the example of FIG. 1, the threshold level can be set to be an average value of the expected output optical signal intensity from each interferometer 22 as shown in FIGS. 2A-2D. The threshold level for each optical thresholding element 24 can be set independently to compensate for differences in the output optical signal intensities for each channel 16 of the optical ADC 10 due to the different lengths of the interferometers 22.

Each optical thresholding element 24 operates to produce a digital train of pulses for a particular bit of the optical digital signal 14 at the frequency and wavelength of the sampling optical signal 110 which serves as a clock input to the optical ADC 10 for conversion of the input optical analog signal 100 to a digital representation.

Figure 3:
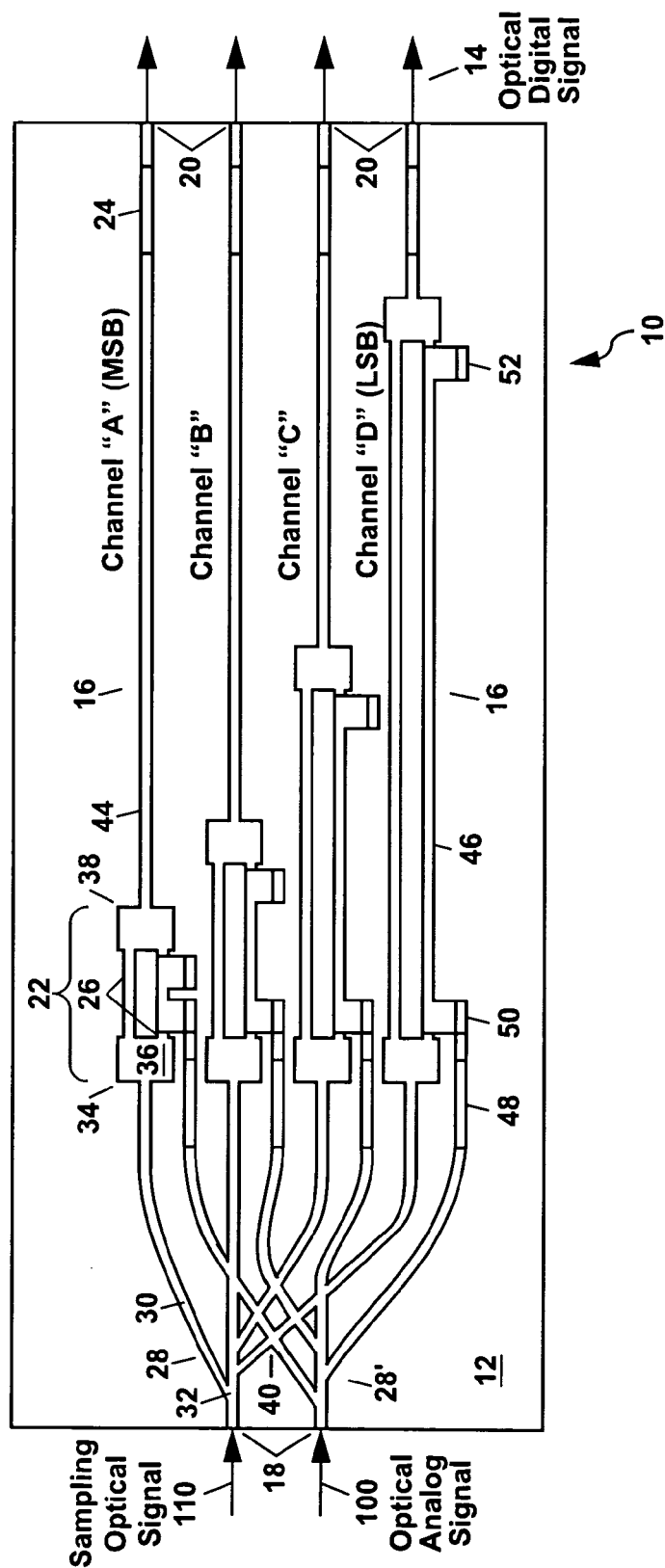
FIG. 3 shows a schematic plan view of a second example of the optical ADC of the present invention.

FIG. 3 schematically illustrates a second example of the optical ADC 10 of the present invention. In this example, each channel 16 of the optical ADC 10 can be formed with a Mach-Zehnder interferometer 22 and an optical thresholding element 24 as previously described. The thresholding elements 24 can each be formed as previously described with reference to FIG. 1 with a width that is the same or larger than that of the waveguides 44, and with a length that can be in the range of 0.1-1 millimeters.

Each interferometer 22 in the example of FIG. 3 can be formed by coupling together a 1×2 MMI splitter 34 and a 2×1 MMI combiner 38. An electrode 46 is provided over the phase delay arm 26 of each interferometer 22 to allow a phase delay to be electrically generated only in this arm 26. This electrically-generated phase delay of the sampling optical signal 110 in the phase delay arm 26 of each interferometer 22 produces a sinusoidal-intensity-modulated optical output signal for each interferometer 22 which is similar to that previously described with reference to FIGS. 2A-2D.

To provide an electrical current signal for the electrodes 46, which is proportional to the optical analog signal 100, the optical analog signal 100 can be amplified with a semiconductor optical amplifier (SOA) 48 and then can be detected with a waveguide photodetector 50. The wavelength of the optical analog signal 100 need not be different from the wavelength of the sampling optical signal 110 for this device 10 since the optical analog signal 100 is completely absorbed in the waveguide photodetector 50 to generate a photocurrent signal. The photocurrent signal flows through to the electrode 46 extending over the phase delay arm 26 of each interferometer 22 to a resistor 52 which is located at an opposite end of the electrode 46; and this generates a voltage on the electrode 46 which reverse biases a semiconductor p-n or p-i-n junction in the phase delay arm 26 therebeneath to produce the phase delay of the sampling optical signal 110. Each SOA 48 and waveguide photodetector 50 can be up to a few hundred microns long.

In other embodiments of the present invention, the optical ADC 10 can be formed with each interferometer 22 having the same length. This can be done, for example, by fabricating the waveguide photodetectors 50 to each have a different effective light-to-current conversion efficiencies which are matched to the strength of the bit being generated in each channel 16 of the optical ADC 10. This allows the generation of photocurrents which can be in the ratios 1:2:4: . . . :2N where N is the number of bits being generated by the optical ADC 10. Thus, for example, the effective light-to-current conversion efficiency for the photodetector 50 in channel "B" can be twice that of channel "A" to provide a phase delay for channel "B" which is twice the phase delay for channel "A." Similarly, the effective light-to-current conversion efficiency for the photodetector 50 in channel "C" can be twice that of channel "B;" and the effective light-to-current conversion efficiency for the photodetector 50 in channel "D" can be twice that of channel "C." In this example, the effective light-to-current conversion efficiency for each photodetector 50 can be adjusted by using different lengths for the photodetectors 50 in each channel 16 (e.g. shortening certain of the photodetectors 50 so that the light 100 is not completely absorbed in these photodetectors 50 and escapes out of one end of the photodetectors 50), or by changing the light absorption within the photodetector 50 using a quantum-well intermixing process as described hereinafter.

As another example, the interferometers 22 and waveguide photodetectors 50 can be formed identically for each channel 16, and the optical gain of the SOAs 48 associated with each photodiode 50 can be scaled (e.g. using the length of the SOAs 48) to provide a factor of two increase in amplification of the optical analog signal 100 for each successive channel 16 which, in turn, will produce a factor of two increase in the photocurrent generated by each successive photodetector 50 to provide the required phase delay for each channel 16.

Figure 4:
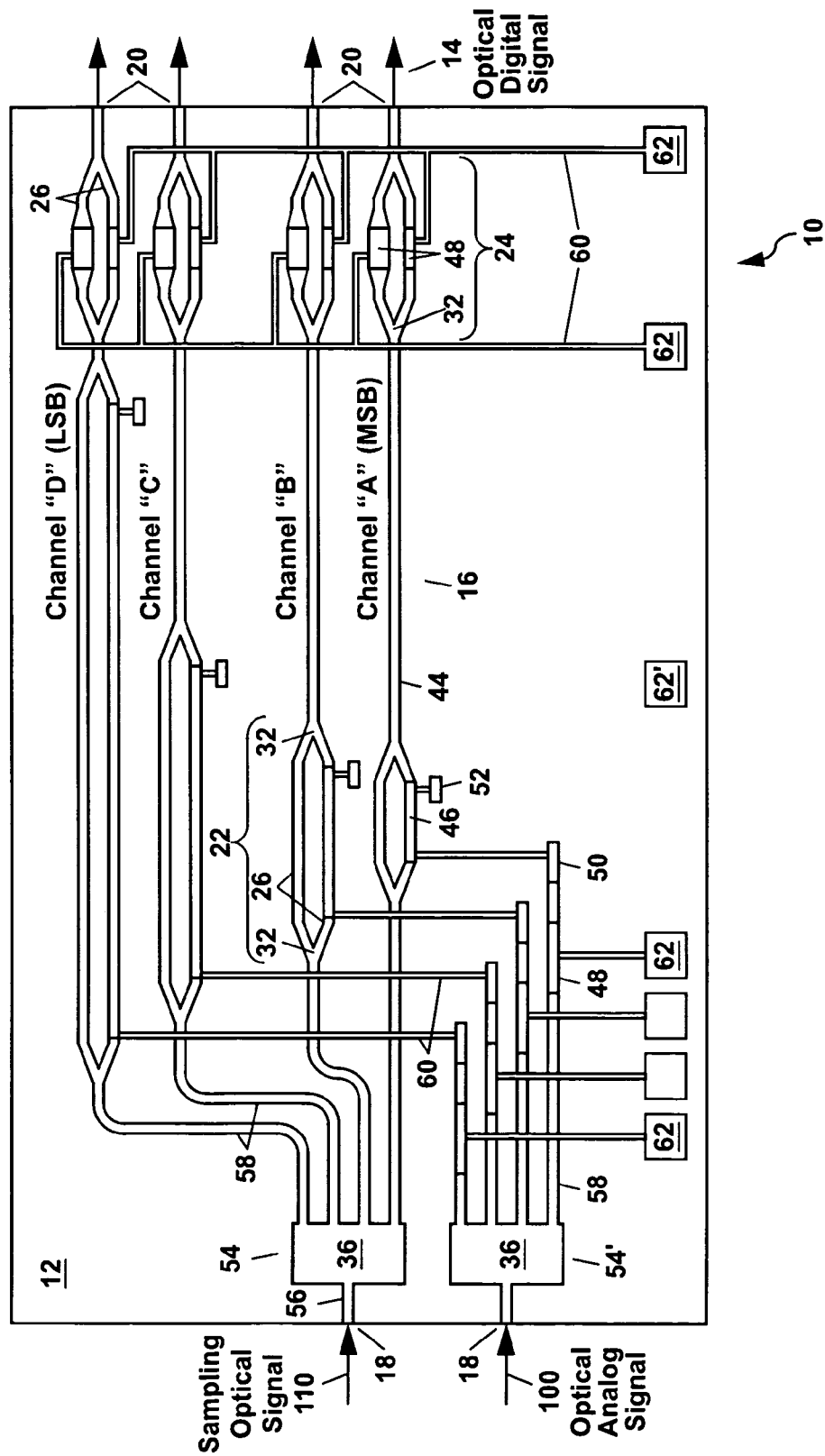
FIG. 4 shows a schematic plan view of a third example of the optical ADC of the present invention.

FIG. 4 schematically illustrates a third example of the optical ADC 10 of the present invention. In this example of the optical ADC 10, a 1×4 MMI splitter 54 is used to split the sampling optical signal 110 for the various Mach-Zehnder interferometers 22. The 1×4 MMI splitter 54 can be formed similarly to the 1×2 splitters in FIGS. 1 and 3 by using a single-mode input waveguide 56 and a laterally-multimoded waveguide section 36 which is designed for coupling into four single-mode output waveguides 58. The output waveguides 58 can be routed to the various interferometers 22 as shown in FIG. 4 with each output waveguide 58 preferably having about the same length.

In FIG. 4, the optical analog signal 100 can be input into another 1×4 MMI splitter 54' and split into the same number of portions (e.g. 4) as the sampling optical signal 110. The split optical analog signals 100 can be directed through the output waveguides 58 to SOAs 48 and therefrom into waveguide photodetectors 50. Each photodetector 50 generates a photocurrent signal which is conducted through wiring 60 to an electrode 46 terminated by a resistor 52, with the electrode 46 being located on a phase delay arm 26 of each interferometer 22. The photocurrent signal flowing through the electrode 46 and resistor 52 to ground produces a reverse-bias voltage across the III-V compound semiconductor material in the phase delay arm 26. This produces a phase delay of the sampling optical signal 110 in the phase delay arm 26 which is proportional to the intensity of the optical analog signal 100. When the signals 110 in the two arms 26 of each interferometer 22 are recombined, the result is a sinusoidal-intensity-modulated optical output signal for each interferometer 22 which is similar to that previously described with reference to FIGS. 2A-2D. The sinusoidal-intensity-modulated optical output signals are then routed through single-mode waveguides 44 to an optical thresholding element 24 where these signals are converted into the optical digital output signal 14.

In the example of FIG. 4, each interferometer 22 can be formed using a pair of oppositely-directed waveguide Y-junctions 32 connected together with single-mode waveguides which form the two waveguide arms 26. Although the interferometers 22 in FIG. 4 are shown with lengths given by L, 2L, 4L and 8L, in other embodiments of the present invention, the lengths of each interferometer 22 can be the same, with a photocurrent from the photodetectors 50 for the various channels scaled in the ratios 1:2:4:8 to provide the required phase delays for each interferometer 22. Alternately, the optical gain from the SOAs 48 associated with each photodetector can be scaled in the ratios 1:2:4:8 with each photodetector 50 then being formed identically but providing a different photocurrents due to a different intensity of the amplified optical analog signal 100 received by that photodetector 50.

In the example of FIG. 4, each optical thresholding element 24 comprises an asymmetric active Mach-Zehnder interferometer formed from a pair of waveguide Y-junctions 32 arranged back-to-back about a pair of SOAs 48 of different widths. In other embodiments of the present invention, a 1×2 MMI splitter 34 and a 2×1 MMI combiner 38 as shown in FIGS. 1 and 3 can be substituted for the Y-junctions 32 in forming each thresholding element 24.

In each thresholding element 24 in the optical ADC 10 of FIG. 4, the two SOAs 48 with different widths produce different optically-induced phase shifts, and this results in a step-like optical transfer characteristic which can be used to condition the optical output signal from the interferometer 22 to produce the optical digital signal 14. One of the SOAs 48 can have a narrow width which is about the same as the waveguide 44 (e.g. 3-4 μm), and the other SOA 48 can have a wide width which can be several times the width of the waveguide 44 (e.g. 10-20 μm). The wide SOAs 48 can be formed using flared waveguides as shown in FIG. 4, or alternately can be located in the laterally-multimoded waveguide section 36 of a 1×1 MMI coupler.

The SOAs 48 in each optical thresholding element 24 can have the same unsaturated optical gain, but the optically-induced phase shift responses for the two SOAs 48 in each thresholding element 24 will be different due to different current densities in the two SOAs 48 resulting from their different widths. These different optically-induced phase shift responses will cause the output of the thresholding element 24 to switch between a low level (i.e. a logical "0" state) and a high level (i.e. a logical "1" state) at some critical input light intensity. Thus, light which is input into the thresholding elements 24 and SOAs 48 at a relatively low optical power level will be amplified about the same in each arm of the interferometer with about the same optically-induced phase shift and thus will be cancelled out via destructive interference at an output side of the thresholding elements 24. This will produce a low optical digital signal 14 corresponding to the logical "0" state. On the other hand, light which is input into the thresholding elements 24 and SOAs 48 above the critical input light intensity will be amplified with a different optically-induced phase shift in each SOA 48 so that constructive interference will occur at the output of each thresholding element 24. This will produce a high optical digital signal 14 corresponding to the logical "1" state.

The various SOAs 48 in FIGS. 3 and 4 can be electrically activated with a dc bias. This can be done using one or more external power supplies which can be connected to the SOAs 48 using additional wiring 60 formed on the substrate 12. This additional wiring 60 for the SOAs 48 can be connected to contact pads 62 located on the substrate 12. An additional contact pad 62' can be electrically connected to a lower electrode semiconductor layer formed on the substrate 12, or to the substrate 12 itself when the substrate 12 is electrically conducting, to provide a common (i.e. ground) electrical connection for the phase delay arms 22, SOAs 48, photodetectors 50 and resistors 52. The wiring 60 connecting the waveguide photodetectors 50 to the electrodes 46 on the phase delay arms 26 and the electrodes 46 and resistors 52 can be designed for low-impedance (e.g. 50Ω), high-speed operation.

The various examples of the optical ADC 10 of the present invention can all be fabricated with a quantum-well intermixing process as described hereinafter using a plurality of III-V compound semiconductor layers epitaxially grown upon the substrate 12. The quantum-well intermixing process allows the fabrication of many different PIC elements to be formed on a common semiconductor substrate 12 much like integrated circuit fabrication while allowing the various elements including the waveguides, interferometers, SOAs, photodetectors and resistors to be individually optimized. This quantum-well intermixing process will be described hereinafter with reference to FIGS. 5A-5D which show schematic cross-section views along the section line 1-1 in FIG. 1 during various steps in the manufacture of the optical ADC 10.

Figure 5A:
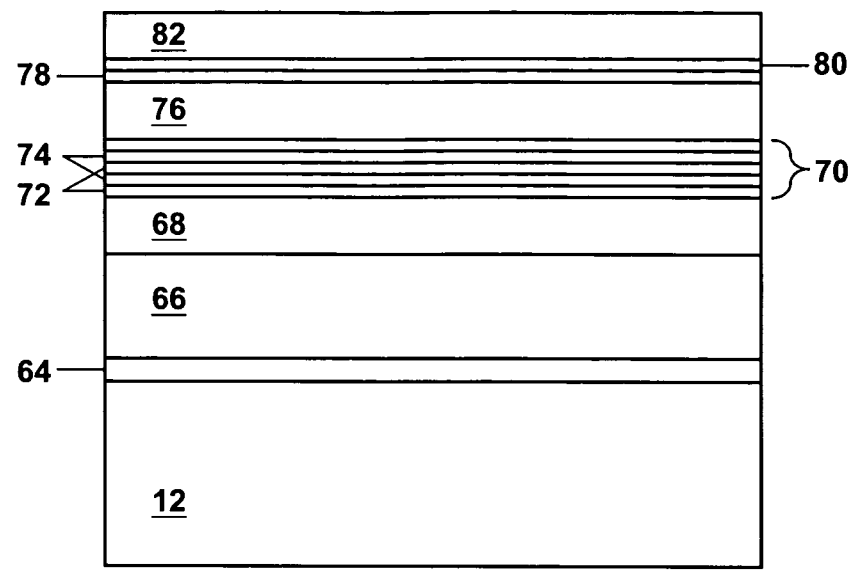
FIGS. 5A-5D show schematic cross-section views along the section line 1-1 in FIG. 1 to illustrate various steps during fabrication of the optical ADC of the present invention using a quantum-well intermixing process.
Figure 5B:
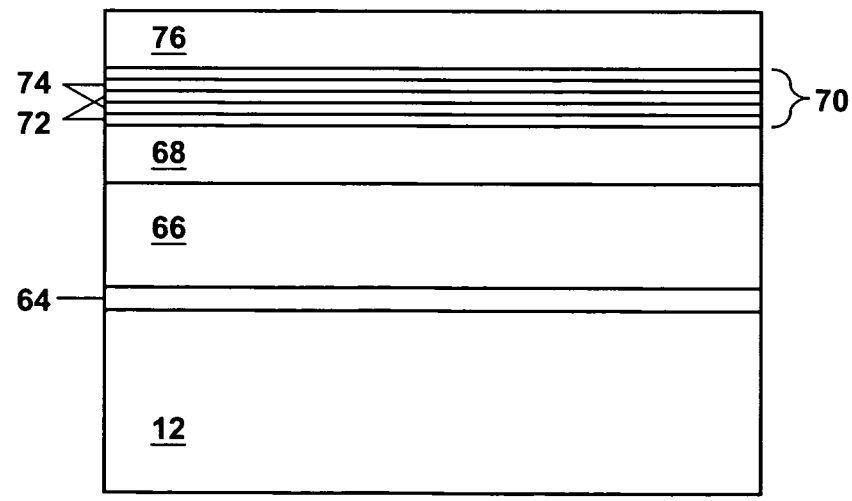

FIG. 5A shows a schematic cross-section view of the plurality of III-V compound semiconductor layers which can be initially epitaxially grown on the substrate 12 in preparation for fabricating the optical ADC 10. The III-V compound semiconductor layers can comprise, for example, indium phosphide (InP) and indium gallium arsenide phosphide (InGaAsP) and indium gallium arsenide (InGaAs) when the substrate 12 comprises InP. Alternately, the III-V compound semiconductor layers can comprise gallium arsenide (GaAs) and either aluminum gallium arsenide (AlGaAs) or InGaAsP when the substrate 12 comprises GaAs. The following discussion will describe fabrication of the optical ADC 10 using InP, InGaAsP and InGaAs, but those skilled in the art will understand that the various process steps described hereinafter can be applied with minor modifications to an optical ADC 10 formed from GaAs and AlGaAs, or any other III-V compound semiconductor materials.

In FIG. 5A, the substrate 12 can comprise a Fe-doped InP substrate 12 upon which are epitaxially grown by metal-organic chemical vapor deposition (MOCVD) in order the following layers: an InP buffer layer (not shown), an n-type InGaAs lower contact layer 64; a lower cladding layer 66 of n-type-doped InP which can be 1-2 μm thick; a lower waveguide layer 68 of InGaAsP which is n-type doped and about 0.11 μm thick with a composition selected to provide an energy bandgap $\lambda g=1.1$ μm; an undoped (i.e. not intentionally doped) MQW region 70 which is about 0.11 μm thick and comprises a plurality of alternating quantum well (QW) layers 72 and barrier layers 74 of InGaAsP each about 8 nanometers (nm) thick, with the quantum well layers 72 having an energy bandgap $\lambda g$ in the range of 1.3-1.7 μm, and with the barrier layers 74 having an energy bandgap $\lambda g=1.1$ μm; a upper waveguide layer 76 of p-type-doped InGaAsP about 0.11 μm thick with $\lambda g=1.1$ μm; an undoped InP etch stop layer 78 about 15 nm thick; an undoped InGaAsP etch stop layer 80 about 20 nm thick with $\lambda g=1.3$ μm; and an undoped InP implant buffer layer 82 about 0.45 μm thick.

An implant mask (e.g. comprising silicon nitride about 0.5 μm thick) can then be provided over the substrate 12 and III-V compound semiconductor layers with openings at locations wherein phosphorous ions are to be implanted into the InP implant buffer layer 82 for use in selectively disordering the MQW region 70. The locations where the waveguide photodetectors 50 and the SOAs 48 are to be formed will generally not have a disordered MQW region 70 since the MQW region 70 is epitaxially grown to optimize the performance of the photodetectors 50 and SOAs 48. The phosphorous ions can be implanted into the layer 82 at an ion energy of about 100 keV and a dose of about $5 \times 10^{14}$ cm$^{-2}$ with the substrate 12 being at a temperature of about 200° C. The implanted phosphorous ions produce vacancies in the InP implant buffer layer 82.

A rapid thermal annealing step can then be used to drive the vacancies into the MQW region 70 to intermix the QW layers 72 and the buffer layers 74 at the interfaces therebetween. This intermixing produces a blue-shift the energy bandgap in the MQW region 70. The rapid thermal annealing step can be performed at a temperature in the range of 630-700° C. and can be timed for a time interval from one minute up to a few tens of minutes to provide a predetermined energy bandgap for the MQW region 70 which will depend upon the exact elements of the optical ADC 10 being formed. To form the waveguide arms 26 in each interferometer 22, a first rapid thermal annealing step can be used to provide a few tens of nanometer blue-shift in the energy bandgap of the MQW region 70 to reduce an absorption loss therein. The blue-shift in the energy bandgap of the MQW region 70 can be determined using a laser-excited room-temperature photoluminescence spectroscopy measurement.

After the first rapid thermal annealing step, the InP implant buffer layer 82 can be removed above the phase delay arm 26 while leaving the layer 82 in place over the other waveguide arm 26 of each interferometer 22. This can be done using a wet etching step to etch away the layer 82, with the wet etching being terminated upon reaching the InGaAsP etch stop layer 80. Removal of the InP implant buffer layer 82 above the phase delay arm 26 prevents any further blue-shift in the MQW region 70 at this location since it removes the source of vacancies necessary for quantum-well intermixing.

A second rapid thermal annealing step can then be performed at about the same temperature for up to a few minutes (e.g. 2-3 minutes) to provide further intermixing of the QW and barrier layers 72 and 74 to produce an additional few tens of nanometers blue-shift the energy bandgap of the MQW region 70 in the remaining regions where the InP implant buffer layer 82 is still present. This additional blue-shift in the energy bandgap of the MQW region 70 further reduces the absorption loss in the various waveguides forming the optical ADC 10.

After the second rapid thermal annealing step is performed, the remaining InP implant buffer layer 82 and the InGaAsP etch stop layer 80 can be removed from the substrate 12 by wet etching. This is schematically illustrated in the cross-section view of FIG. 5B.

Figure 5C:
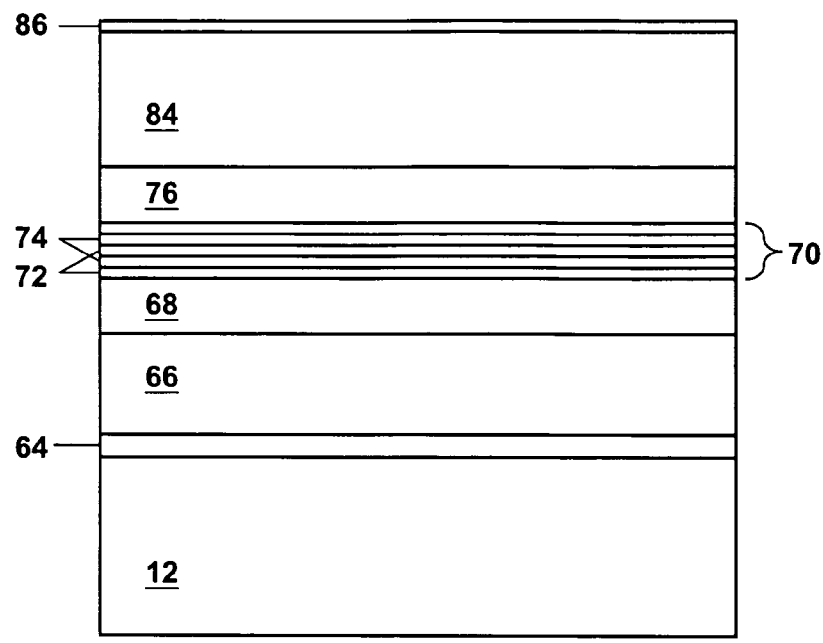

A blanket MOCVD regrowth can then be performed to epitaxially grow an upper cladding layer 84 of p-type-doped InP which can be, for example, 2.35 μm thick followed by a cap layer 86 of p-type-doped InGaAs about 0.2 μm thick. This is shown in FIG. 5C. The p-type-doped upper waveguide layer 76 and InP upper cladding layer 84 in combination with the n-type-doped lower cladding layer 66 and waveguide layer 68 form a semiconductor p-i-n junction about the MQW region 70 when the region 70 is left undoped (i.e. not intentionally doped). This semiconductor p-i-n junction is needed for electrically-activated elements in the optical ADC including the phase delay arm 26, the thresholding elements 24, the SOAs 48 and the waveguide photodetectors 50.

Figure 5D:
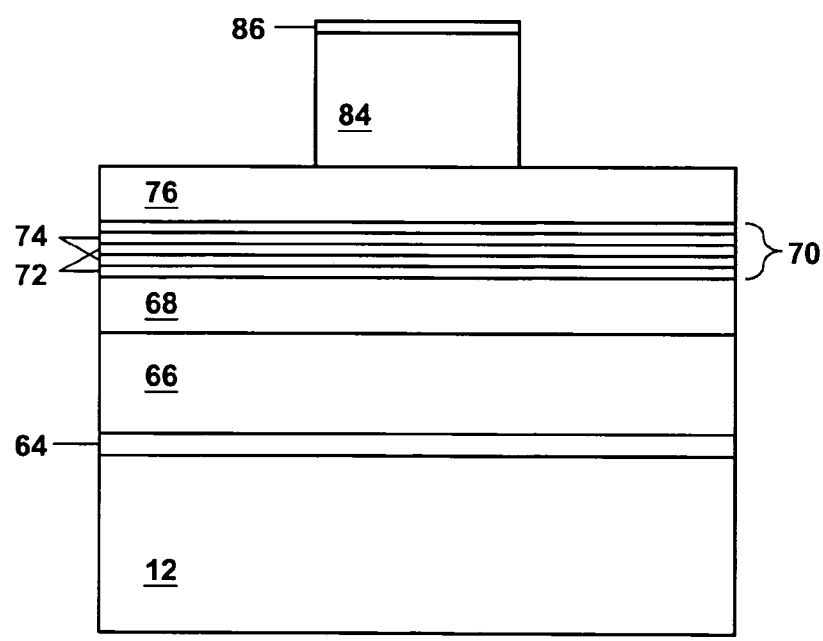

An etch mask (not shown) can be provided over the substrate 12 and photolithographically patterned for use in etching down through the InGaAs cap layer 86 and the InP upper cladding layer 84 as shown in FIG. 5D. This defines the lateral dimensions of the various waveguides 26, 30, 44 and 56 in FIGS. 1, 3 and 4 which can be 3-4 μm wide. Etching down to the InGaAs lower contact layer 64 can also be performed in preparation for forming the contact pad 62'.

Layers of silicon nitride and benzocyclobutene (BCB) can then be deposited over the substrate 12 and patterned to provide openings where the various electrodes, resistors 52, wiring 60 and contact pads 62 and 62' are to be formed. The silicon nitride layer can be about 0.1-0.2 μm thick. The BCB layer can be about the same thickness (e.g. 2-3 μm) as the InP upper cladding layer 84 and can be used to planarize the substrate 12. This is useful to reduce the capacitance of the electrical wiring 60 for high-speed operation. The resistors 52 can be deposited as thin-film metal resistors (e.g. comprising tantalum nitride or nichrome). A Ti/Pt/Au metallization can then be deposited and patterned by lift-off to form the electrodes 46, wiring 60 and contact pads 62 and 62' and electrical connections to the optical thresholding elements 24, SOAs 48 and resistors 52.

Figure 6:
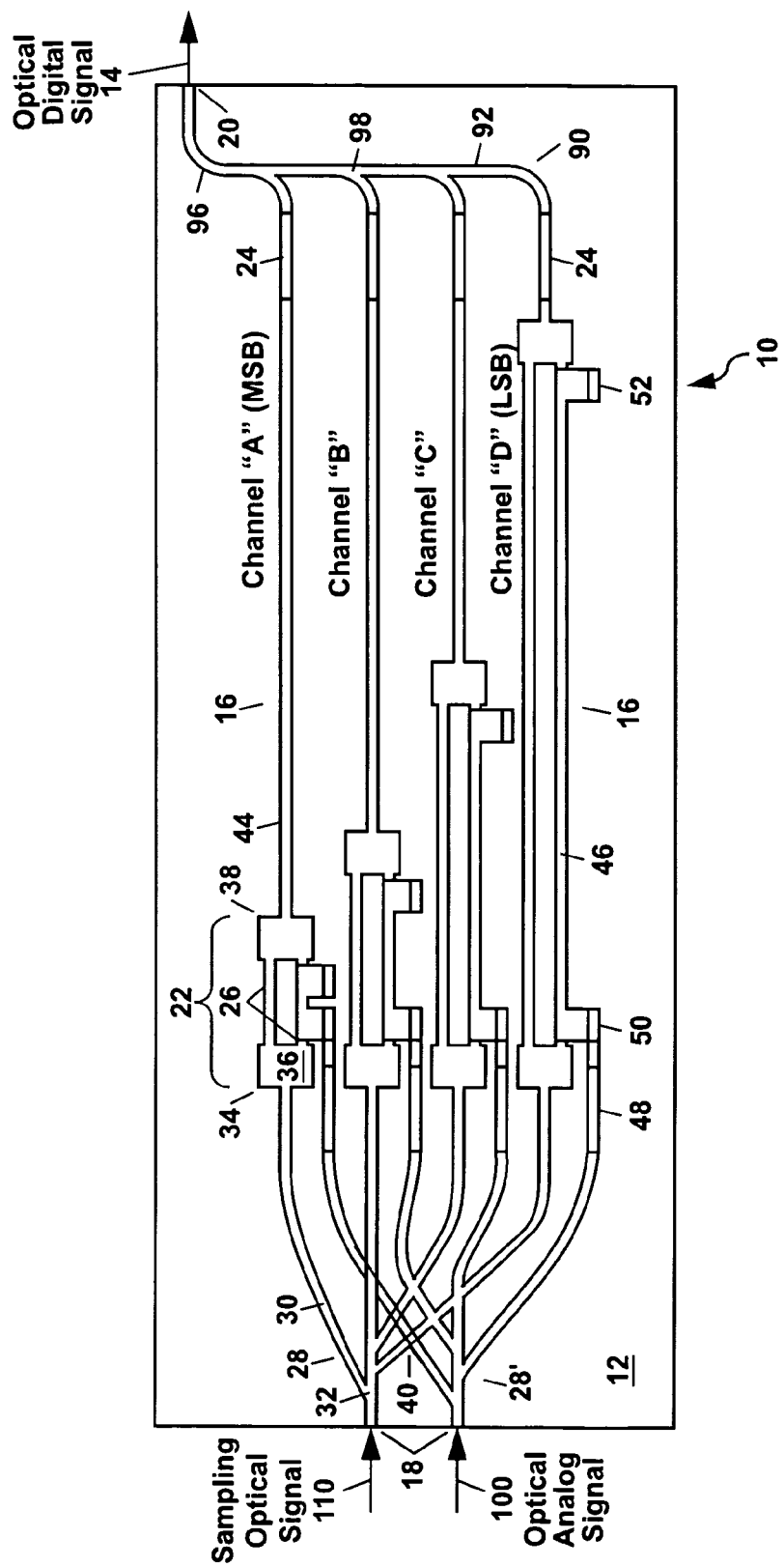
FIG. 6 shows a schematic plan view of a fourth example of the optical ADC of the present invention which includes an optical waveguide combiner to provide a parallel-to-serial conversion of the digital output signal of the optical ADC.
Figure 7:
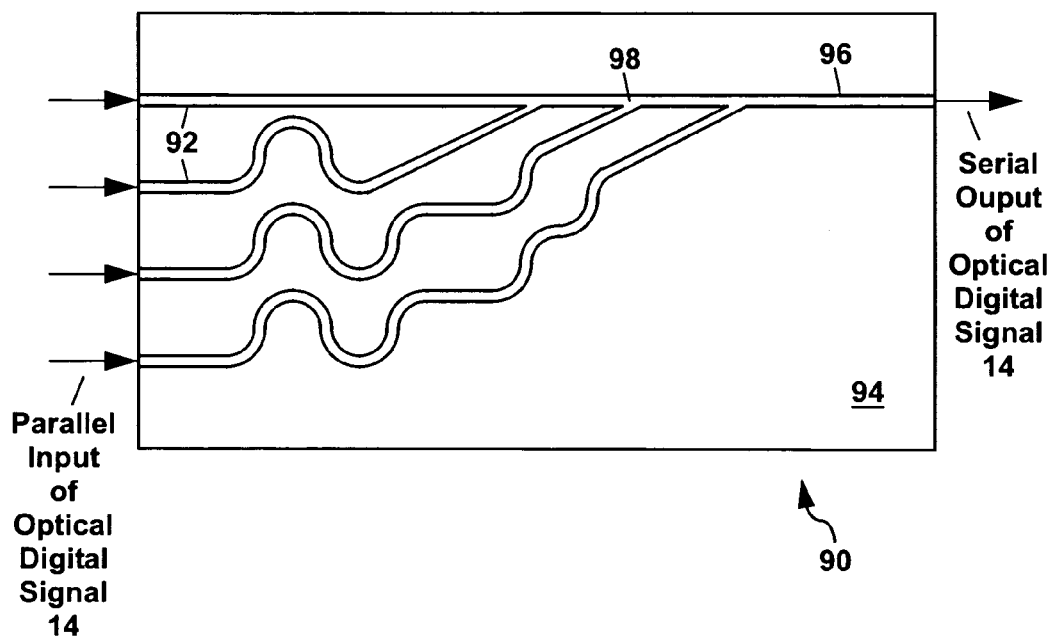
FIG. 7 shows a schematic plan view of a photonic integrated circuit which can be formed on a separate substrate and used with the optical ADC of the present invention to perform a parallel-to-serial conversion of the digital output signal of the optical ADC.

Although the various examples of the optical ADC 10 described herein with reference to FIGS. 1, 3 and 4 provide a parallel output of each bit of the optical digital signal 14, in other embodiments of the optical ADC 10 an optical waveguide combiner 90 can be used to convert the parallel output of the optical ADC 10 into a serial output. Since each bit of the optical digital signal 14 comprises a series of logical "1" state and logical "0" state pulses at a clock frequency determined by the sampling optical signal 110, these pulses for each bit of the optical digital signal 14 can be interleaved and combined to form a train of N-bit digital words for the serial output. To properly time the pulses for each bit of the optical digital signal 14 so that they can be interleaved and combined, delay lines can be used. These delay lines are formed from different-length optical waveguides 92 located on the common semiconductor substrate 12 after the thresholding elements 24 as shown in FIG. 6, or alternately can be located on a separate substrate 94 as shown in FIG. 7 for butt-coupling to the optical ADC 10. The exact difference in length of the optical waveguides 92 for adjacent bits of the optical digital signal 14 will depend upon the sampling rate and can be, for example, 1-20 millimeters (mm). For example when the sampling rate is 10 Gigabits per second (Gb/s) with each pulse being 100 picoseconds (ps), the difference in length of the each adjacent pair of the optical waveguides 92 can be 10-20 mm; and when the sampling rate is 60 Gb/s with 12 ps pulses, the length difference can be 1-2 mm.

The various bits of the optical digital signal 14 are delayed in time by the waveguides 92 which can be appropriately sized using waveguide bends so that each bit generated by one of the channels 16 can be interlaced in time and combined into a single output waveguide 96. Combining of the various bits from each channel 16 into the single output waveguide 96 can be performed using a plurality of converging waveguide Y-junctions 98 as shown in FIGS. 6 and 7, or alternately with a N×1 MMI combiner which can be formed in a manner similar to the 1×4 MMI splitter 54 in FIG. 4. Each waveguide 92 and 96 of the optical waveguide combiner 90 can be formed as single-mode waveguides using the quantum-well intermixing fabrication process previously described with reference to FIGS. 5A-5D.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An optical analog-to-digital converter for converting an optical analog signal to an optical digital signal, comprising:
a plurality of channels, with each channel receiving the optical analog signal and a sampling optical signal and generating therefrom a bit of the optical digital signal, and with the plurality of channels including a first channel providing a most significant bit (MSB), a last channel providing a least significant bit (LSB), and a plurality of intermediate channels providing bits of lessening significance between the MSB and the LSB, and with each channel being formed on a common semiconductor substrate and including:
an optical waveguide interferometer having a pair of waveguide arms, with the sampling optical signal being split and directed into each waveguide arm, and with the optical analog signal being directed into only one waveguide arm to produce a phase delay of the sampling optical signal in that waveguide arm, and with the optical waveguide interferometer generating an optical output signal by combining the sampling optical signal from the pair of waveguide arms; and
an optical thresholding element to receive the optical output signal from the optical waveguide interferometer and to generate therefrom one of the bits of the optical digital signal.

2. The converter of claim 1 wherein the semiconductor substrate comprises indium phosphide (InP) or gallium arsenide (GaAs).

3. The converter of claim 1 further comprising a plurality of optical waveguides formed on the semiconductor substrate to conduct the optical analog signal and the sampling optical signal from input ports located on one edge of the semiconductor substrate to the plurality of channels, and to conduct each bit of the optical digital signal from one of the optical thresholding elements to a different output port located on another edge of the semiconductor substrate.

4. The converter of claim 1 wherein the optical analog signal is provided by a semiconductor laser, and the sampling optical signal is provided by another semiconductor laser.

5. The converter of claim 1 wherein the plurality of channels receiving the optical analog signal and the sampling optical signal comprises four channels.

6. The converter of claim 1 wherein the optical waveguide interferometer in each of the plurality of channels has a different length given by L, 2L, 4L, ... $2^{(N-1)}$L where N is a number of bits of the optical digital signal, and L is the length of the optical waveguide interferometer in the channel providing the MSB of the optical digital signal, and $2^{(N-1)}$L is the length of the optical waveguide interferometer in the channel providing the LSB of the optical digital signal.

7. The converter of claim 1 wherein the optical analog signal is split into a plurality of portions by an optical waveguide splitter prior to being received into the plurality of channels, and the sampling optical signal is split into a plurality of portions by another optical waveguide splitter prior to being received into the plurality of channels.

8. The converter of claim 1 wherein each optical waveguide interferometer comprises a Mach-Zehnder interferometer.

9. The converter of claim 1 wherein the optical thresholding element comprises an asymmetric active Mach-Zehnder interferometer having a semiconductor optical amplifier which provides a different optically-induced phase shift in each waveguide arm of the asymmetric active Mach-Zehnder interferometer to provide a step-like optical transfer characteristic and thereby condition the optical output signal to produce the optical digital signal.

10. The converter of claim 1 wherein the optical thresholding element comprises a saturable absorber.

11. An optical analog-to-digital converter for converting an optical analog signal to an optical digital signal, comprising:
a plurality of channels each receiving the optical analog signal and a sampling optical signal and providing a bit of the optical digital signal, with the plurality of channels including a first channel providing a most significant bit (MSB), a last-channel providing a least significant bit (LSB), and a plurality of intermediate channels providing bits of lessening significance between the most MSB and the LSB, with each channel being formed on a common semiconductor substrate and including:
a waveguide photodetector to convert the optical analog signal into a photocurrent signal;
an optical waveguide interferometer having a pair of waveguide arms, with the sampling optical signal being split and directed into each waveguide arm, and with the photocurrent signal being provided to an electrode located proximate to only one of the pair of waveguide arms to produce a phase delay in the sampling optical signal in that waveguide arm, and with the optical waveguide interferometer generating an optical output signal by combining the sampling optical signal from the pair of waveguide arms; and
an optical thresholding element to receive the optical output signal and to generate therefrom one of the bits of the optical digital signal.

12. The converter of claim 11 wherein the semiconductor substrate comprises indium phosphide (InP) or gallium arsenide (GaAs).

13. The converter of claim 11 further comprising a plurality of optical waveguides formed on the semiconductor substrate to conduct the optical analog signal and the sampling optical signal from input ports located on one edge of the semiconductor substrate to the plurality of channels, and to conduct each bit of the optical digital signal from one of the optical thresholding elements to a different output port located on another edge of the semiconductor substrate.

14. The converter of claim 11 wherein the optical analog signal is provided by a semiconductor laser, and the sampling optical signal is provided by another semiconductor laser.

15. The converter of claim 11 wherein the plurality of channels receiving the optical analog signal and the sampling optical signal comprises four channels.

16. The converter of claim 11 wherein each optical waveguide interferometer in each of the plurality of channels has substantially the same length, and each waveguide photodetector provides a different photocurrent signal.

17. The converter of claim 11 wherein the optical waveguide interferometer in each of the plurality of channels has a different length given by L, 2L, 4L, ... $2^{(N-1)}L$ where N is a number of bits of the optical digital signal, and L is the length of the optical waveguide interferometer in the channel providing the MSB of the optical digital signal, and $2^{(N-1)}L$ is the length of the optical waveguide interferometer in the channel providing the LSB of the optical digital signal.

18. The converter of claim 11 wherein the optical analog signal is split into a plurality of portions by an optical waveguide splitter prior to being received into the plurality of channels, and the sampling optical signal is split into a plurality of portions by another optical waveguide splitter prior to being received into the plurality of channels.

19. The converter of claim 11 wherein each optical waveguide interferometer comprises a Mach-Zehnder interferometer.

20. The converter of claim 11 wherein the optical thresholding element comprises an asymmetric active Mach-Zehnder interferometer having a semiconductor optical amplifier which provides a different optically-induced phase shift in each waveguide arm of the asymmetric active Mach-Zehnder interferometer to provide a step-like optical transfer characteristic and thereby condition the optical output signal to produce the optical digital signal.

21. The converter of claim 11 wherein the optical thresholding element comprises a saturable absorber.

22. An optical analog-to-digital converter formed on a semiconductor substrate as a photonic integrated circuit, comprising:
a pair of optical input ports on the semiconductor substrate to receive an optical analog signal and a sampling optical signal, with the sampling optical signal defining a sampling rate at which the optical analog signal is to be converted into an optical digital signal;
a pair of optical waveguide splitters on the semiconductor substrate, with one optical waveguide splitter receiving the optical analog signal and splitting the optical analog signal into a number N portions where N is equal to a number of bits of the optical digital signal, and with the other optical waveguide splitter receiving the sampling optical signal and splitting the sampling optical signal into N portions;
a plurality of waveguide photodetectors on the semiconductor substrate to receive the N portions of the optical analog signal and to generate therefrom N photocurrent signals;
a plurality of optical waveguide interferometers located on the semiconductor substrate, with each optical waveguide interferometer having a pair of waveguide arms which are interconnected at each end of that optical waveguide interferometer, and with each optical waveguide interferometer receiving one of the N portions of the sampling optical signal and one of the N photocurrent signals and generating in response thereto an optical output signal containing information needed to form one bit of the optical digital signal; and
a plurality of optical thresholding elements located on the semiconductor substrate, with each optical thresholding element receiving the optical output signal from one of the plurality of optical waveguide interferometers and generating therefrom one of the bits of the optical digital signal.

23. The converter of claim 22 further comprising a plurality of optical output ports on the semiconductor substrate, with each optical output port providing an optical output of one of the bits of the optical digital signal.

24. The converter of claim 22 further comprising a plurality of semiconductor optical amplifiers located between the optical waveguide splitter for the optical analog signal and the plurality of waveguide photodetectors.

25. The converter of claim 22 wherein the semiconductor substrate comprises a III-V compound semiconductor substrate.

26. The converter of claim 22 wherein the wavelength of the sampling optical signal is a range of 0.8-2.0 microns.

27. The converter of claim 22 wherein each optical waveguide interferometer has substantially the same length, and each waveguide photodetector provides a different photocurrent signal.

28. The converter of claim 22 wherein the different lengths of each optical waveguide interferometer are given by L, 2L, 4L, ... $2^{(2N-1)}$L where N is the number of bits of the optical digital signal, and L is the length of the optical waveguide interferometer which provides a most significant bit (MSB) of the optical digital signal, and $2^{(N-1)}$L is the length of the optical waveguide interferometer which provides a least significant bit (LSB) of the optical digital signal.

29. The converter of claim 22 wherein each optical thresholding element comprises an asymmetric active Mach-Zehnder interferometer having a semiconductor optical amplifier which provides a different optically-induced phase shift in each waveguide arm of the asymmetric active Mach-Zehnder interferometer to provide a step-like optical transfer characteristic and thereby condition the optical output signal to produce the optical digital signal.

30. The converter of claim 22 further comprising an optical waveguide combiner to receive each bit of the optical digital signal and to generate therefrom a serial optical output.

* * * * *